Dec. 15, 1970 D. E. KNUTH 3,548,174
RANDOM NUMBER GENERATOR
Filed Aug. 10, 1966
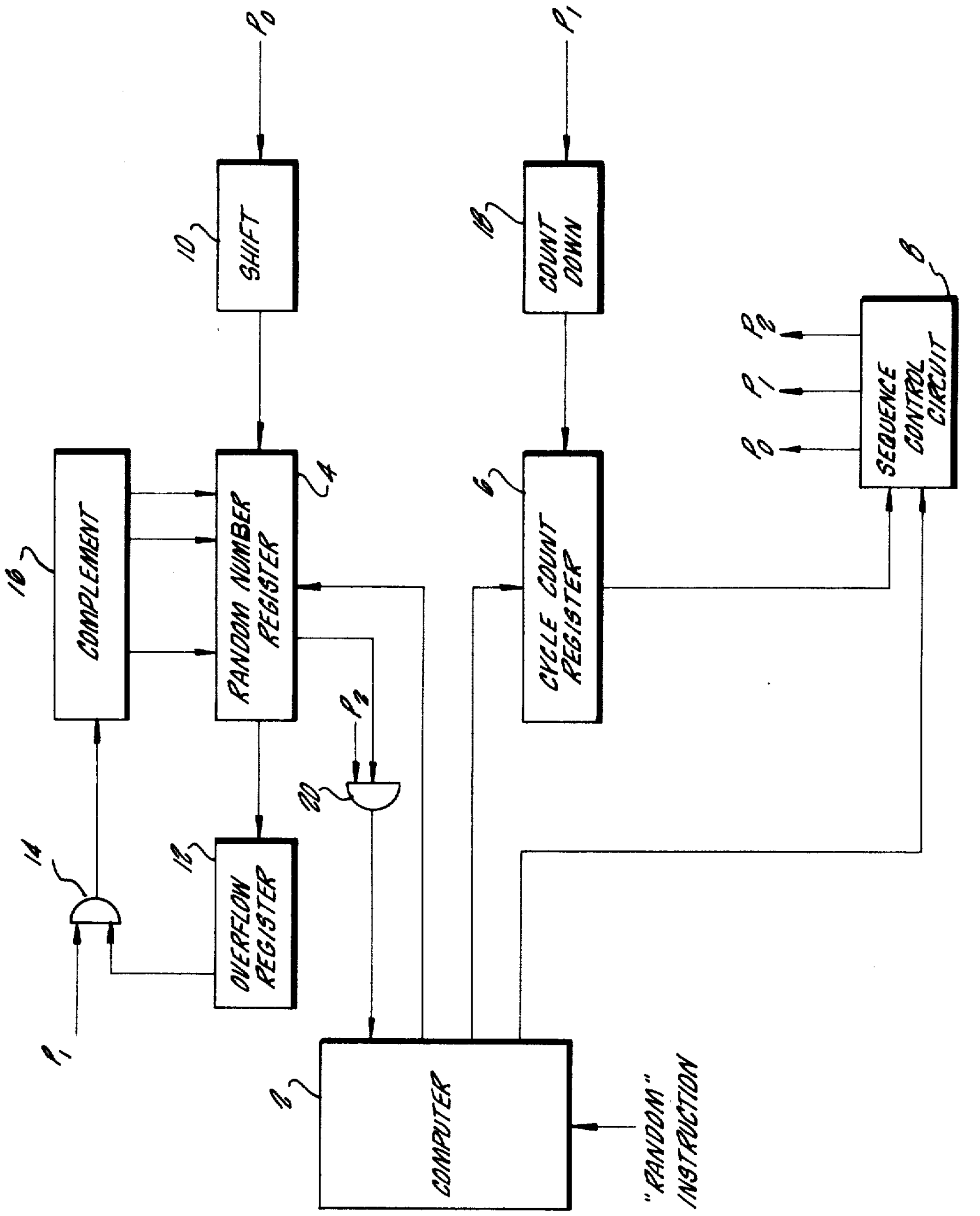
INVENTOR
DONALD E. KNUTH
BY
Christie, Parker & Hale
ATTORNEYS

United States Patent Office

3,548,174

Patented Dec. 15, 1970

3,548,174

RANDOM NUMBER GENERATOR

Donald E. Knuth, Sierra Madre, Calif., assignor to Burroughs Corporation, Detroit, Mich., a corporation of Michigan

Filed Aug. 10, 1966, Ser. No. 571,448
Int. Cl. G06f *13/06;* H03k *5/00*
U.S. Cl. 235—152 10 Claims

ABSTRACT OF THE DISCLOSURE

A binary number having good randomness properties is produced by emptying a starting number into a storage register and then shifting each digit of the starting number to the next higher order bit position a plurality of times, thus dropping the highest order bit with each shift. After each shift the bits occupying a plurality of selected bit positions are complemented when the bit dropped by the preceding shift is a predetermined value.

This invention relates to the generation of random numbers and, more specifically, to a random number generator particularly well-suited for use in conjunction with a digital computer.

In many fields of scientific endeavor, situations exist that require a source of random numbers. One typical example is simulating actual operating conditions while testing a piece of apparatus. In this case, a series of random numbers might represent different operating conditions Commonly, random numbers in binary form are generated in digital computers by the so-called multiplicative-congruential methods. These methods, however, yield numbers that are only random in the higher denominational order bit positions. A series of random numbers that exhibis a good degree of randomness and independence is disclosed in an article entitled "Random Numbers Generated by Linear Recurrence Modulo Two" by Robert C. Tausworthe, appearing in the periodical Mathematics of Computation, vol. 19, April 1965, on pages 201 through 209. The Tausworthe article does not disclose how to generate this series of random numbers and no straightforward, easily implementable way to generate this series suggests itself.

According to the invention, a random number generator is provided, in which a random number in binary form is produced by shifting each bit of a starting number to the next higher order bit position, thereby dropping the highest order bit, and complementing the bits occupying specific bit positions, if the highest order, dropped bit is a predetermined value. This cycle is executed one or more times depending upon the characteristics of the series of random numbers desried. The extent of randomness and the independence between successive random numbers are controlled by selection of the length of the starting number, i.e., the quantity of bit positions, and how often the cycle is repeated. The series of numbers generated in this way is different from that disclosed in the above-mentioned Tausworthe article. It is similar, however, and has comparable randomness properties, which can be proved in the same manner as the proof of the randomness properties of the series of numbers disclosed in the Tausworthe article.

These and other features of the invention are considered further in the following detailed description taken in conjunction with the drawing, the single figure of which is a schematic circuit diagram in block form of a random number generator embodying the principles of the invention.

The invention recognizes and utilizes the fact that a binary number produced by one or more cycles of the following operations has good randomness properties: (1) shifting each digit of a starting number to the next higher order bit position thus dropping the highest order bit and then (2) complementing the bits occupying selected positions, only when the dropped bit is a predetermined value. Execution of five cycles of these operations with respect to an initial binary number having five bit positions to generate one random number of a series is illustrated in the following table:

| | | Dropped digit | $x_4$ | $x_3$ | $x_2$ | $x_1$ | $x_0$ | |
|---|---|---|---|---|---|---|---|---|
| | Initial number → | | 1 | 0 | 0 | 1 | 1 | Operations |
| Cycle 1 | Step 1 | 1 | 0 | 0 | 1 | 1 | 0 | Shift—complement $x_0$ and $x_2$. |
| | Step 2 | | 0 | 0 | 0 | 1 | 1 | |
| Cycle 2 | Step 1 | 0 | 0 | 0 | 1 | 1 | 0 | Shift—no complement. |
| | Step 2 | | 0 | 0 | 1 | 1 | 0 | |
| Cycle 3 | Step 1 | 0 | 0 | 1 | 1 | 0 | 0 | Shift—no complement. |
| | Step 2 | | 0 | 1 | 1 | 0 | 0 | |
| Cycle 4 | Step 1 | 0 | 1 | 1 | 0 | 0 | 0 | Shift—no complement. |
| | Step 2 | | 1 | 1 | 0 | 0 | 0 | |
| Cycle 5 | Step 1 | 1 | 1 | 0 | 0 | 0 | 0 | Shift—complement $x_0$ and $x_2$. |
| | Step 2 | | 1 | 0 | 1 | 0 | 1 | |
| | Final number → | | 1 | 0 | 1 | 0 | 1 | |

In the above table, the binary number being operated upon has five bit positions represented by $x_0$, $x_1$, $x_2$, $x_3$, and $x_4$, respectively moving from the lowest to the highest denominational order. The bits in the lowest order position, i.e., $x_0$, and the third order position, i.e., $x_2$, are complemented each time that the dropped, highest order bit has a value of 1. The properties of the random numbers generated in the above-illustrated way are regulated by selecting the length, i.e., the number of bit positions, of the number operated upon, hereafter designated $e$, and the number of times the cycle is repeated in generating each random number, hereafter designated $f$. The larger $e$ is, the more randomness the generated number exhibits. Therefore, $e$ should be selected as large as practicable. The high order $f$ bits of the random number generated are random. Thus, if $f=1$, only the highest order bit is random, whereas, if $f=e$, all the bits of the number are random. On the other hand, the independence of adjacent groups of the generated numbers is related to $e/f$. For example, if $e/f=1/3$ groups of three successive numbers are independent of one another. If $f=e$, the independence of the generated numbers is poor. The numbers are uniformly distributed, but adjacent numbers are not statistically independent. In contrast, if $f=1$, a high degree of independence results, but, as previously mentioned, the randomness of the generated numbers is poor. A good compromise is struck when $f$ is selected to be about one-third $e$, but not a divisor of $e$. For example, $e$ could be 48 and $f$ could be 17. In this case, the generated numbers within groups of three are essentially independent, and the higher order one-third bits of the generated numbers are random.

The bit positions that complemented depend on the length $e$ of the number being operated upon. For any particular length $e$, these positions are fixed. The bit positions to be complemented can be found experimentally in such a way that the cycle, if repeated over and over, causes each nonzero number to be generated before the original number is repeated. Alternatively, the bit positions to be complemented can be obtained from tables, such as the table disclosed in an article entitled "Primitive Polynomials (Mod 2)" by E. J. Watson, appearing in the periodical Mathematic of Computation, vol. 16, 1962, on pages 368 and 369. For example, if $e=24$, then bit positions $x_4$, $x_3$, $x_1$, and $x_0$ are complemented.

In the drawing, a random number generator embodying the principles of the invention is shown operating with a digital computer. Upon the occurrence of a "random" instruction, including operator information, address information, and if desired, information about the number of cycles $f$ to be executed in generating each number, a nonzero starting number or a previously generated random number is retrieved from computer memory and emptied into a random number register 4. At the same time, the binary number from the instruction representing the number of cycles $f$ to be executed is emptied into a cycle count register 6. Instead, register 6 could be preset for a fixed number of cycles $f$, in which case no information concerning it must be contained in the instruction. It is in general convenient to select the length of the random number $e$ and the capacity of register 4 equal to the size of a word of computer 2, i.e., the amount of information that can be stored in and retrieved from computer memory as one unit. After registers 4 and 6 are filled, a sequence control circuit 8 begins operation responsive to a signal generated in computer 2. Sequence control circuit 8 comprises timing and combinational circuits well known in the art that generate pulses in a time sequence to control the operation of the random number generator. Upon the appearance of a pulse on lead $P_0$, a shift circuit 10 is actuated to shift each bit contained in random number register 4 to the next higher order bit position. The highest order bit is thereby shifted into an overflow register 12, after which it is dropped.

Upon appearance of a pulse on lead $P_1$, a signal is produced by an AND gate 14 if the value of the digit then in overflow register 12 is "1." Responsive thereto, the digits occupying selective positions in random number register 4 are complemented by means of a complement circuit 16. If the bit then in overflow register 12 is "0," the complementing operation is not executed during this cycle. The count contained in cycle count register 6 is also reduced by one by a count down circuit 18 responsive to a pulse on lead $P_1$.

Thereafter, sequence control circuit 8 returns to the initial condition and once again produces a pulse on lead $P_0$. This two operation cycle is repeated until cycle count register 6 contains a zero count. In response to the zero count in register 6 sequence control circuit 8 generates a pulse on lead $P_2$ instead of returning immediately to the initial condition. The contents of random number register 4 are at this time gated through an AND circuit 20 by the pulse on lead $P_2$ and returned to the location in computer memory formerly occupied by the number initially to random number register 4. Each time a new random number is required, the random number generator produces a random number in the described manner responsive to the "random" instruction and supplies this random number to the computer.

Although the random number generator of the invention is particularly well suited for use with a computer, it can be operated independently, in which case the input information, i.e., the initial number and $f$, is fed into the generator by a human operator. Although this "random" instruction is particularly well suited for generating streams of random numbers, it is also useful as a randomizing or "scrambling" function, sometimes called a "hash function." Such functions are used in well-known ways in the computer art to remove certain biases and patterns in data that tend to reduce the efficiency of techniques for sorting or storing and retrieving information.

What is claimed is:

1. A random number generator comprising: means for storing a binary number having a fixed number of bit positions; means for shifting each bit of the binary number to the next higher order bit position a plurality of times; and means after each shift for complementing the bits of a plurality of selected bit positions of the binary number less than the fixed number of bit positions, only if the highest order bit before said shift is a predetermined value.

2. The random number generator of claim 1, in which the means for storing a binary number is a register having a capacity $e$, where $e$ is the number of bits in the number to be generated, and the shifting means is actuated $f$ times in generating a random number.

3. The random number generator of claim 2, in which $f$ is approximately equal to ⅓ of $e$, which is indivisible by $f$.

4. The random number generator of claim 1, in which a source of starting numbers and means for coupling the source to the means for storing a binary number are provided.

5. A random number generator comprising a first register for storing a binary number, means for storing infomation representing the number of cycles of operations to be performed, and means for performing a cycle of operations the number of times represented by the information stored in the storing means, the cycle including in the order recited, means for shifting each bit of the binary number stored in the register to the next higher order bit position such that the highest order bit is shifted out of the first register and means for complementing the bits of binary number occupying selective predetermined bit positions after each shifting operation, when the bit shifted out of the first register is a predetermined value.

6. The random number generator of claim 5, in which the storing means is a second register and means are provided for reducing the number stored in the second register responsive to the completion of each cycle of operations.

7. The random number generator of claim 6, in which the first register is emptied responsive to the reduction of the binary number stored in the second register below a predetermined value.

8. The random number generator of claim 5, in which an overflow register is provided to store the bit shifted out of the first register, the complementing operation being actuated in response to the appearance of a binary "1" in the overflow register.

9. The random number generator of claim 6, in which an overflow register is provided to store the bit shifted out of the first register, the complementing operation being actuated in response to the appearance of a binary "1" in the overflow register.

10. The random number generator of claim 5, in which the first register has a capacity of $e$ bits and the cycle is performed $f$ times, where $f$ is approximately equal to ⅓ of $e$, which is indivisible by $f$.

References Cited

UNITED STATES PATENTS

| | | | |
|---|---|---|---|
| 3,171,082 | 2/1965 | Dillard et al. | 235—152UX |
| 3,250,855 | 5/1966 | Vasseur | 340—147X |
| 3,274,376 | 9/1966 | Evans et al. | 235—150.31 |

(Other references on following page)

UNITED STATES PATENTS

| | | | |
|---|---|---|---|
| 3,311,884 | 3/1967 | Mengel ------------ | 340—147 |
| 3,366,779 | 1/1968 | Catherall et al. ------ | 235—152 |

OTHER REFERENCES

Kramer: A Low-Frequency Pseud-Random Noise Generator. In Electronic Engineering pp. 465–567, July 1965.

Buron et al.: Noise Generated By Digital Technique, IBM Technical Disclosure Bulletin; p. 1232, February 1966 vol. 8, No. 9.

EUGENE G. BOTZ, Primary Examiner

U.S. Cl. X.R.

328—37; 340—147, 168, 172.5; 307—221